M. J. WOLFF.
ROTARY AUTOMATIC CORNUCOPIA BAKING MACHINE.
APPLICATION FILED MAY 26, 1919.

1,344,285.

Patented June 22, 1920.

Inventor,
Michael J. Wolff

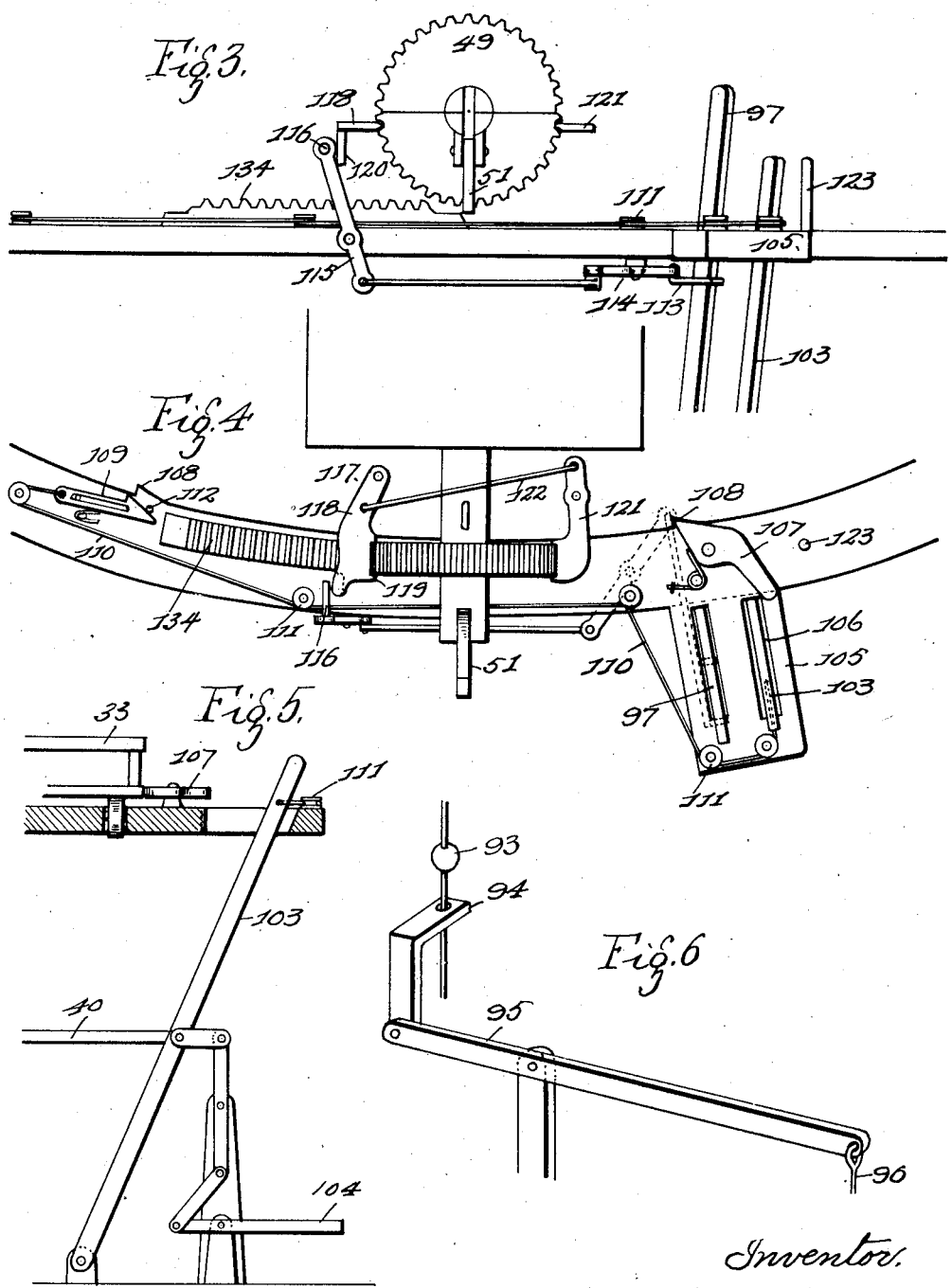

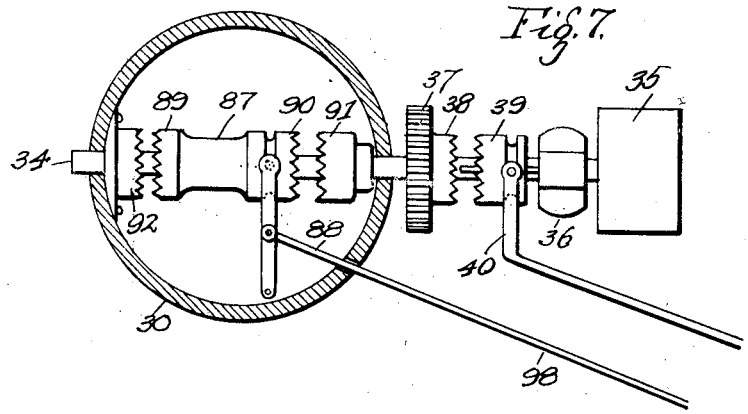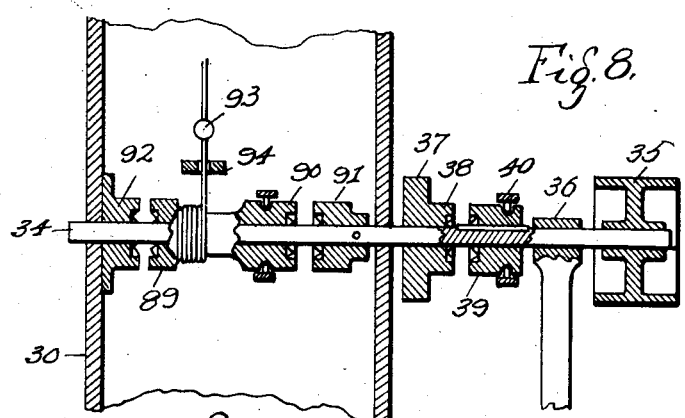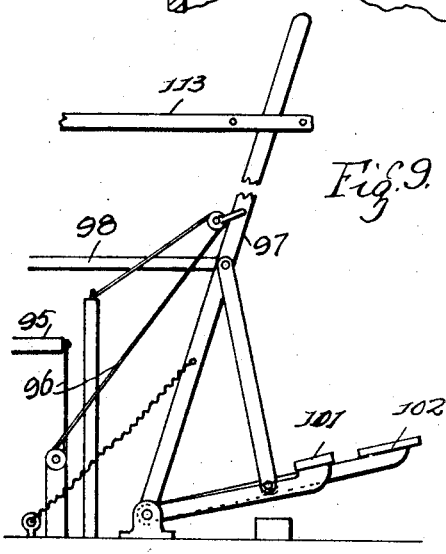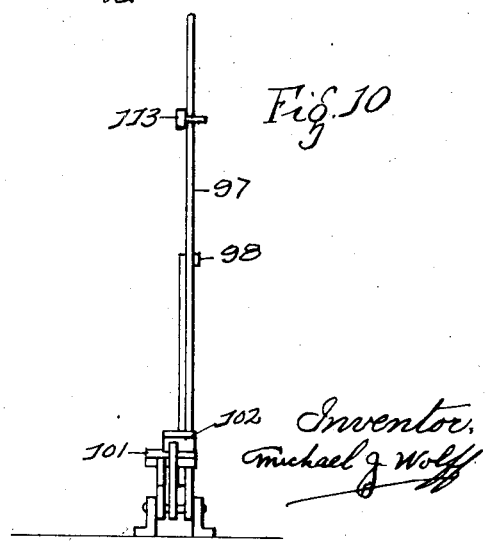

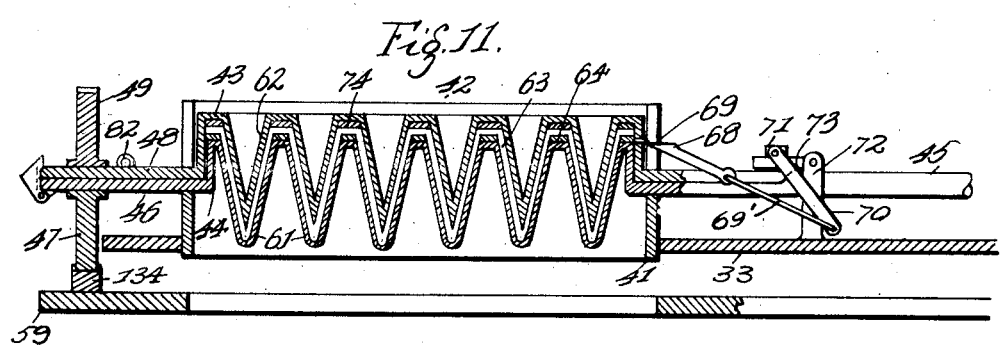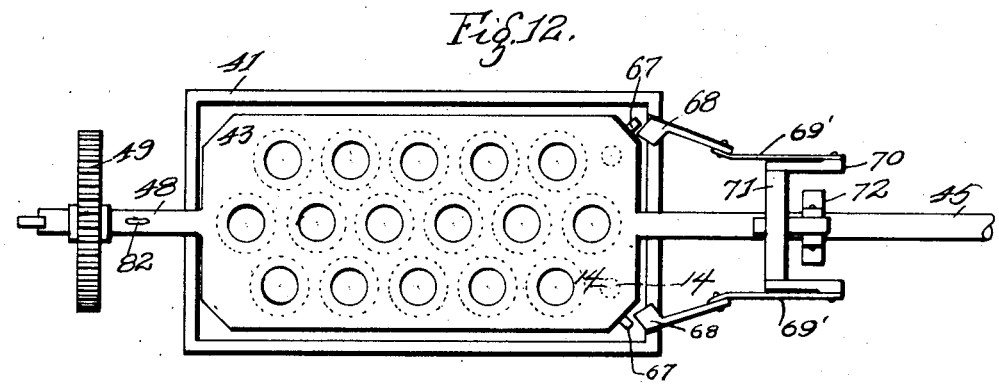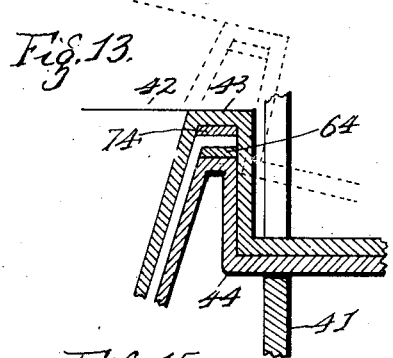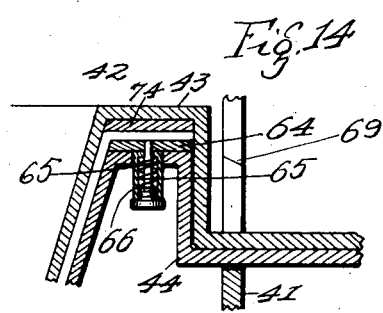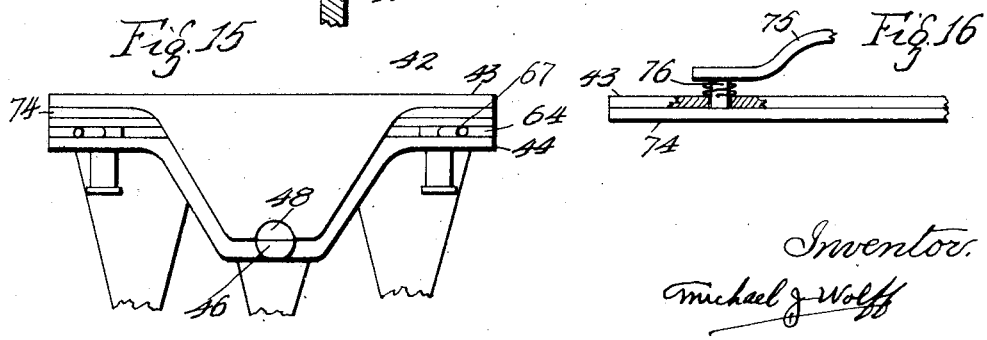

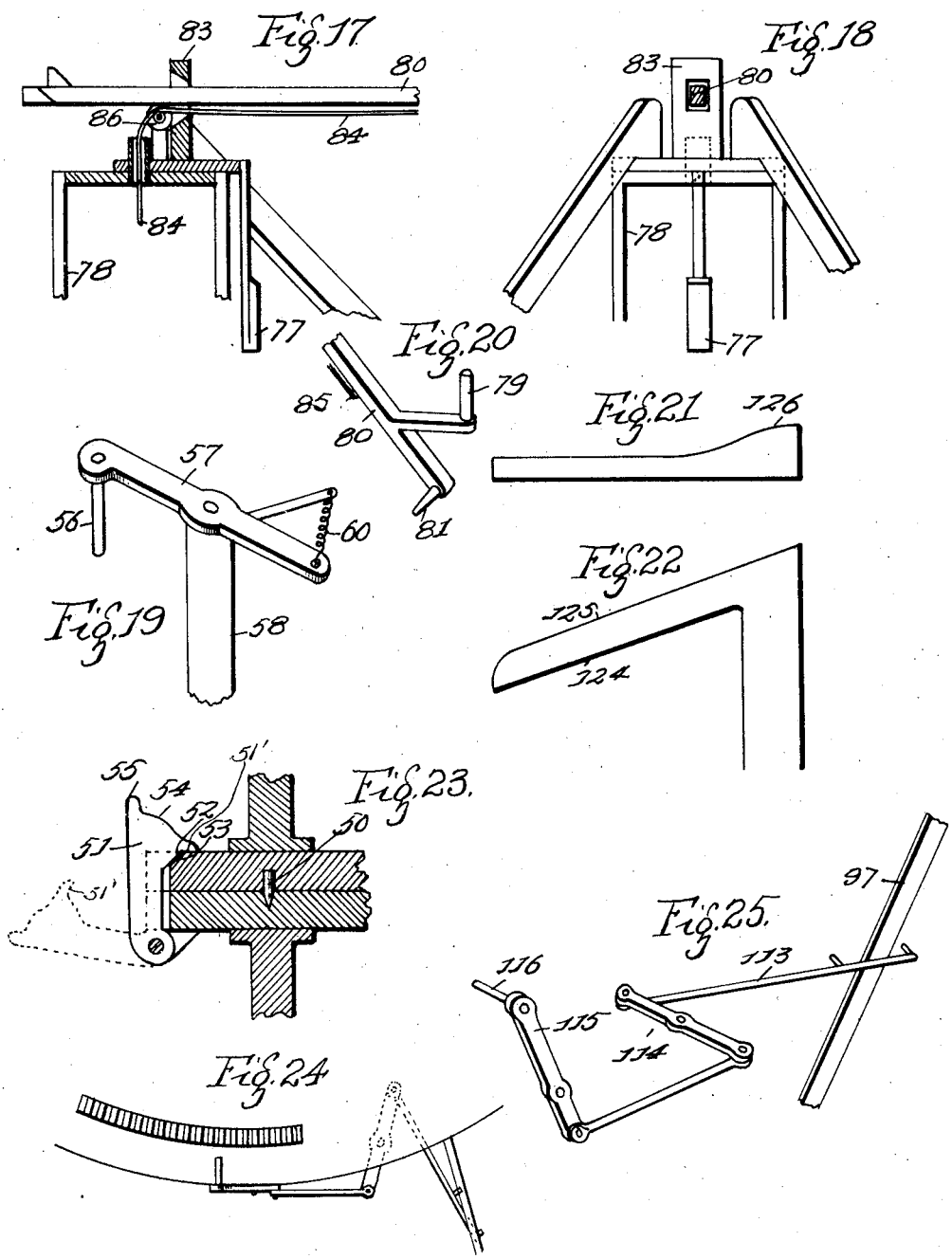

M. J. WOLFF.
ROTARY AUTOMATIC CORNUCOPIA BAKING MACHINE.
APPLICATION FILED MAY 26, 1919.

1,344,285.

Patented June 22, 1920.
6 SHEETS—SHEET 6.

UNITED STATES PATENT OFFICE.

MICHAEL J. WOLFF, OF ST. LOUIS, MISSOURI.

ROTARY AUTOMATIC CORNUCOPIA-BAKING MACHINE.

1,344,285.     Specification of Letters Patent.     Patented June 22, 1920.

Application filed May 26, 1919. Serial No. 299,855.

*To all whom it may concern:*

Be it known that I, MICHAEL J. WOLFF, a citizen of the United States, and resident of St. Louis, Mo., have invented certain new and useful Improvements in Rotary Automatic Cornucopia - Baking Machines, of which the following is a specification.

This invention relates to improvements in a rotary automatic cornucopia baking machine, and has for its object a rotating table on which is mounted a plurality of baking molds each arranged to automatically turn at a given period so that the heat from the burners beneath the rotating table will evenly bake the cake in the mold on both sides, and a means for stopping the rotation of the table so that the baked cake can be removed from the mold, and a new batter of dough again placed in the mold for the reception of the baking process.

A further object of my invention is to construct a rotary baking machine on which is mounted a plurality of molds, which molds are constructed in halves, the upper half being hingedly mounted so that the same can be raised away from the lower half of the mold, and means for holding the lower half of the mold rigid when the upper half is being raised and lowered and a mechanism for automatically releasing the mold lock when the table is placed in rotation.

A further object of my invention is to equip a rotating baking machine with a clutch mechanism for starting and stopping the table and also a clutch mechanism operated by a lever for automatically raising the upper half of the mold when it is desired to remove the cake and replenish the mold with new dough, and a series of racks located on the stationary frame of the table by which the molds are turned at suitable intervals, and a series of burners located beneath the spaces occupied by the molds and an automatic means for regulating the burners during the movement of the table.

Fig. 3, is a front view of a portion of the table showing the means for turning the mold and for locking the same.

Fig. 4, is a top plan view of the same.

Fig. 5, is a detail view of one of the levers made use of for operating the table rotating mechanism.

Fig. 6, is a detail perspective view of a lever mechanism which automatically releases the drum from the clutch when the mold has reached its limit of height.

Fig. 7, is a detail horizontal sectional view of the table pedestal showing the clutch mechanism by which the table is rotated and the mold operating drum.

Fig. 8, is a vertical sectional view of the same.

Fig. 9, is a side view of the lever mechanism by which the mold operating drum is manipulated.

Fig. 10, is an edge view of the same.

Fig. 11, is a central vertical sectional view of one of the baking molds.

Fig. 12, is a top plan view of the same.

Fig. 13 is an enlarged detail sectional view of a portion of the mold, showing its general construction.

Fig. 14, is an enlarged detail sectional view of a portion of the mold taken on the line 14—14 of Fig. 12.

Fig. 15, is an end view of the rear portion of the mold.

Fig. 16, is a detail view of a portion of the upper half of the mold showing the cake releasing plate.

Fig. 17, is a sectional view of a portion of the upper framework located above the table.

Fig. 18, is a front view of the same.

Fig. 19, is a detail perspective view of the lever mechanism by which the mold lock is automatically released.

Fig. 20, is a detail perspective view of the lower end of a lever by which the upper half of the mold is raised.

Fig. 21, is a top plan view of the finger used for automatically closing the mold lock.

Fig. 22, is a side view of the same.

Fig. 23, is a detail sectional view of a portion of the mold supporting shaft with a mold lock in position therewith.

Fig. 24, is a detail top plan view of the lever mechanism attached to the table and used for operating the locking mechanism which holds the mold in rigid position.

Fig. 25, is a perspective view of the lever mechanism.

Figure 1:
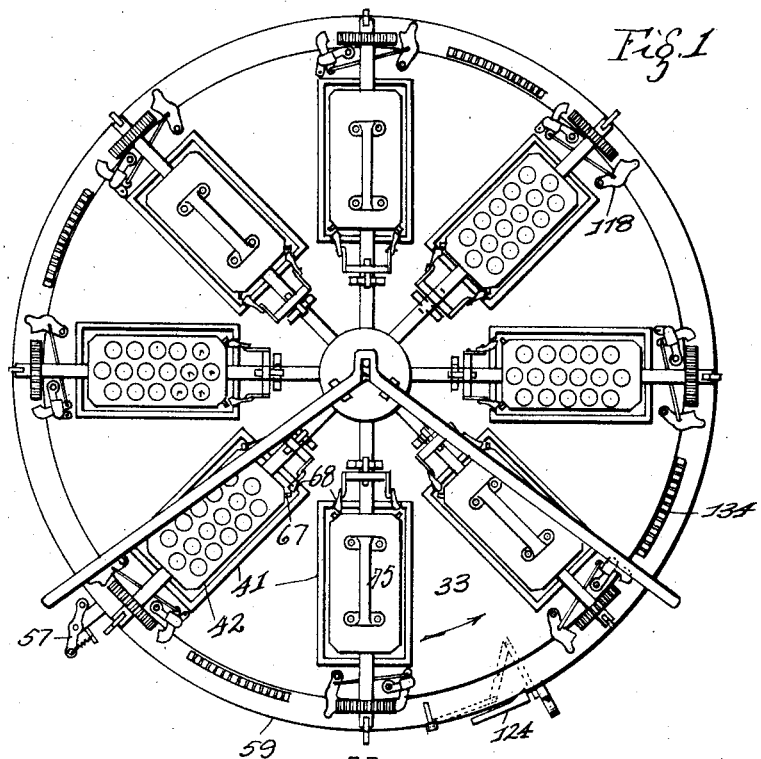
Figure 1, is a top plan view of my improved baking machine.
Figure 2:
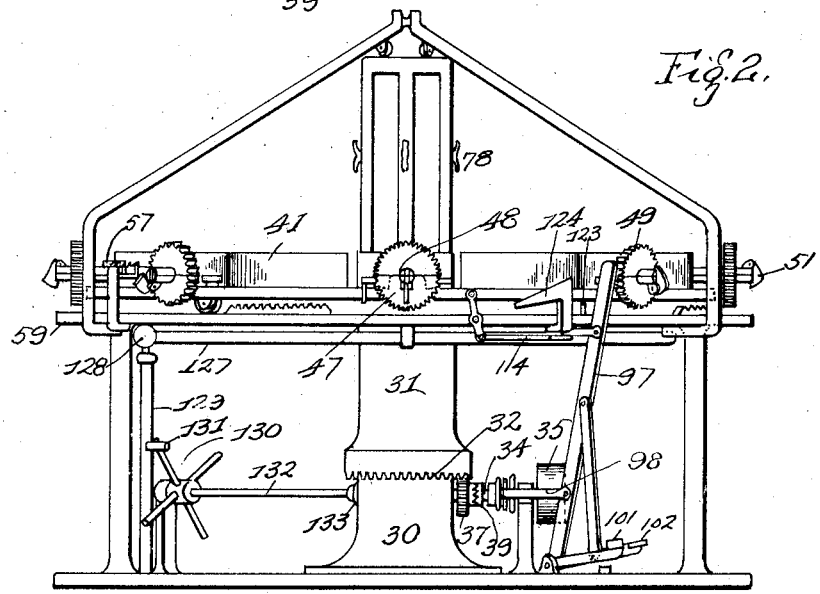
Fig. 2, is a front view of the same.

In the general description of my invention and referring particularly to Figs. 1 and 2, I construct a machine by having a central base portion 30 on which is mounted a tubular casing 31, the same provided at its bottom with a rack 32. On this tubular member is supported a table 33, which is placed in rotation by a driving mechanism consisting of a shaft 34 mounted in the base 30 and on said shaft is a drive pulley 35. On this shaft and supported in bearing 36 is located a gear wheel 37 the same being provided with one section 38, of a clutch which is designed to mesh with the sliding sections 39 of the clutch and when the member 39 is in contact with the section 38 by means of the lever 40, the gear wheel 37 is placed in rotation and by means of its teeth meshing with the rack 32 the table is rotated.

The table 33 is provided with a plurality of frames 41, with openings formed in the table and in these frames are located the baking molds 42. These molds consisting of two sections 43 and 44. The section 43 is hingedly mounted while the section 44 is retained in horizontal position. The section 44 is supported on a shaft 45, the end of which is supported in the central tubular casing 31 and which acts as a pivot for the rotation of the shaft at intervals during the operation of the machine.

The forward end of the member 44 is provided with a semi-circular shaft 46 and on which is mounted the lower half 47 of a split gear, the upper hinged portion 48 of the mold is attached to two semi-circular members of the shaft; the front section communicating with the section 46 and when the two are together it makes a complete shaft. On this section is attached the other half 49 of the split gear. These gears are provided with pins 50 which register with depressions formed in the opposite half and are for the purpose to keep the two sections of the split gear in perfect relation.

On the front end of the semi-circular section 46 is pivotally mounted a mold lock or latch 51, the same is provided with a tapered surface 52 which contacts with a bevel 53 formed on the upper section of the shaft and its tendency is to press the two halves together when the dough is inserted in the mold, and is so arranged as to prevent the sections of said mold from spreading during the baking process by means of the flat or rectangular portion 51′ extending over a portion of the upper section of the shaft, the structure being clearly illustrated in Fig. 23.

The upper portion of the lock is provided with a curved surface 54 and a finger 55, the finger 55 is designed to come in contact at the proper period with the pin 56 located on the pivoted lever 57 which lever is mounted on the post 58 and secured in rigid position to the stationary section 59 of the frame. And when this surface contacts with the pin 56 it will open the lock automatically before it reaches the point where it is desired to open the mold and remove the baked cake.

The lever 57 is brought back to its normal position after having contact with the lock by means of the spring 60.

The lower section of the mold is provided with a plurality of hollow cones 61 and the upper movable section is provided with cones 62 which are somewhat smaller than the cones 61 so as to provide sufficient space between the two for the insertion of the dough and give the cake its sufficient thickness. This space is illustrated in Fig. 11 and indicated by the numeral 63.

On the top of the lower section of the mold is a plate 64, which has openings to correspond with the openings of the cones, and the same is held in position by means of pins 65 extending through the lower section and provided with springs 66 for holding the plate against the top of the lower section. This plate is also provided with two projecting trunnions 67 with which the dogs 68 are to be brought in contact when the pressure of the upper section of the mold is released by the raising of the same. Then these dogs which ride on an incline 69 formed on the frame will have a tendency to raise the plate 64 a slight distance which will remove or release the baked cones from the interior of the lower mold. By this releasing feature the operator can then easily remove the baked series of cones without unusual breakage. These cones after being baked are attached to a sheet of baked dough which sheet is formed by the space of the upper plate. When the mold is again lowered, this plate operating mechanism is automatically returned to its normal position and the springs 66 will automatically bring the plate in close contact with the mold.

The plate operating mechanism consists of the dog 68 attached to rods 69′ which are in turn fastened to the lever 70; these levers being mounted on a bar 71 connected to the supporting post 72 and the same is placed in operation by means of the upper section of the shaft which forms a part of the upper portion of the mold and is pivoted to the shaft 45 at the point indicated by the numeral 73. And when this upper section is raised it moves the lever mechanism just described forwardly in order to contact with the trunnions 67.

On the under side of the upper mold is provided a plate 74, this plate is controlled by the handle 75 which when contacted with will press the plate 74 away from the top of the mold and this plate is brought back to its normal position by the spring 76.

This handle is operated when the upper mold is raised and the handle brought in contact with the hanger 77 located on the upper frame work 78 and which is positioned at the center of the machine.

The object of this is that should the baked cake stick to this plate the movement is to release it from the upper mold.

The upper mold section is raised by means of the operator grasping the handle 79 of the lever 80, which is supported on the top of the frame work 78 between radial bars extending from the stationary table frame, and then passing the pin 81 on said lever into the eye 82 formed on the upper half section of the shaft of the mold. This lever is slidably mounted in a bracket 83 formed on top of the frame 78 and is pulled rearwardly after being inserted through the eye 82, this pulling being accomplished by means of the cable 84 which cable is attached to the lever at the point indicated by the numeral 85 and passes over a roller 86 and then extends downwardly through the frame and is attached to the drum 87 located on the shaft 34.

This drum is placed either in rotation, held in locked position or held in released position by means of the clutches and the operating lever 88.

Both ends of the drum are provided with clutch members 89 and 90, the clutch 90 is to be brought in contact with the clutch 91, passing rigidly to the shaft 34 and is brought in contact therewith when it is desired to wind up the cable 84 which will raise the upper half of the mold, and when the mold has reached its upward position it will automatically shift the drum to the opposite side so that its clutch 89 engages with the clutch member 92 which is held stationary. This automatic shifting is done by means of a ball 93, held rigid on the cable and contacts with an arm 94, which operates the lever 95, pulling upon the cable 96 which in turn pulls on the operating lever 97, causing movement of the rod 98 which latter being connected to the drum, slides same out of engagement with the clutch member 91 and thus disconnects the drum from the rotating clutch member 91 and at the same time moves the clutch member 89 into engagement with the stationary clutch 92 to lock the drum from further rotation.

When the cake has been removed after the upper half of the mold has been raised a supply of fresh dough is placed in the mold from the dough retainer 99, which is of any desirable structure and is mounted on fulcrums 100, conveniently located on the side of the machine and so arranged that it may be swung over the mold, the dough deposited and the same returned back to its position out of the way of the machine.

In order to lower the upper mold after the dough has been inserted the operator places his foot on a short lever 101 and by pressing downwardly until it contacts with the block beneath pulls back the lever 97 a short distance, releasing the drum from the stationary clutch, this action is caused by the foot treadle of the lever 101 extending over the lever 102. Then the mold will return by its own gravity into position and then by means of pressure of the foot on the lever 102, the lever 97 is brought back to farther distance which will throw the clutch 90 in contact with the clutch 91 for again raising the upper half at the proper period.

Figure 26:
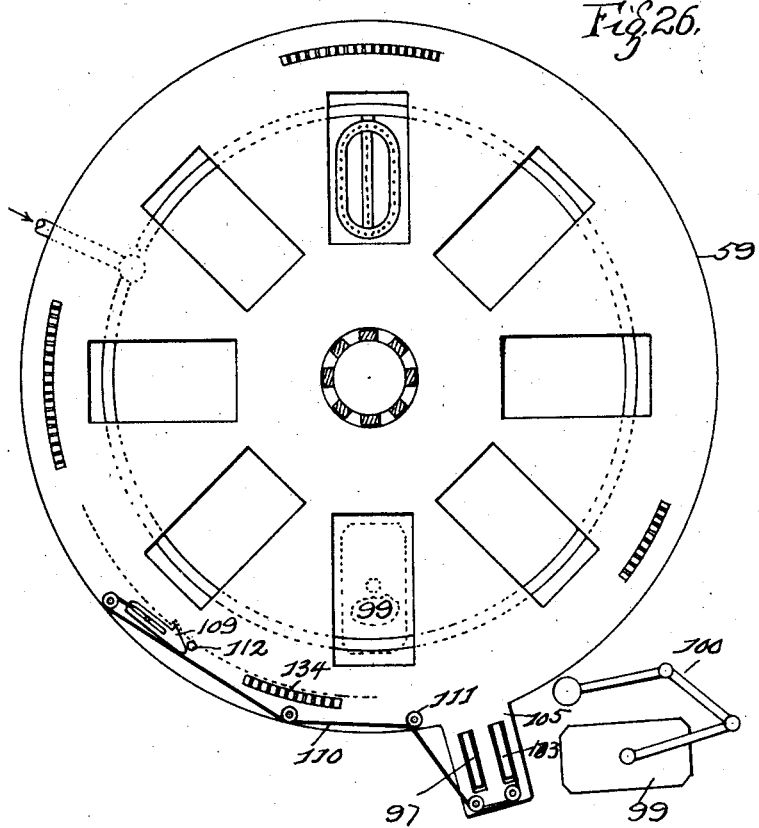
Fig. 26, is a top plan view of the stationary part of the table.

When the upper portion of the mold has been placed in position the machine is then placed in rotation by the operator manipulating the lever 103, this throws in the clutch 39, this can be either done by the hand contacting with the upper portion of the lever or by the foot pressure on the treadle 104. These two levers are guided in an extension 105 formed on the stationary portion of the frame and operated in slots 106. By throwing in the lever 103 to place the machine in rotation the lever contacts with the pawl 107 which acts as a temporary lock and located on the frame releasing it from the notch 108 formed in the edge of the table. This will then permit the table to continue on its rotation and is again automatically stopped by the pawl 107 when the mold reaches the next aperture or opening formed in the stationary table or frame as that shown in Fig. 26.

The molds during their rotation pass from burner to burner and when the same reaches a certain spot the notches 108 formed in the table contact with a pawl 109. This pawl is slidably mounted on the table and is connected to a cable 110. The cable 110 is placed over a plurality of rollers 111 mounted on the stationary portion of the table frame, its one end attached to the lever 103, and when said lever has been forced inwardly the pawl 107 is forced out of locking engagement with the table, thus permitting said table to turn. The lever 40 being connected to the lever 103 and also being connected with the clutch member 39 will upon movement of the lever 103 forward, force the clutch member into engagement with the other portion 38 of the clutch, thus imparting rotation to the gear 37 which latter being in engagement with the rack 32 will cause the table 33 to rotate, the lever 103 therefore has a two-fold function, it returns the pawl 109 to such position that it may be engaged by the rotating table and produce a pull on the cable 110 to throw the clutch members 38 and 39 out of engagement to stop the movement of the table and also releases the pawl 107 so that the latter may be in position to engage the notch 108 so that the table may be brought to a stop at predetermined points.

On the stationary portion of the table is mounted a pin 112 which has a tendency to throw the pawl 109 back out of engagement with the notch, this is accomplished by the inclined surface on the pawl 109 riding against the pin and by the movement of said pawl while the same is being released from the notch 108, has a pulling effect on the cable 110 which releases the lever 103 from its position against the pawl 107.

By the manipulation of the lever 97, an arm 113 is operated, it in turn operates the fulcrums 114 thereby tilting the arm 115 which is provided with a pin 116. This pin is for the purpose of operating the locking mechanism 117, which consists of a pivoted pawl 118 having a tooth portion 119 which is to contact with the teeth of the gear wheels located on the mold shafts, and this pawl is likewise provided with a downward projection 120 with which the pin 116 contacts. This locking mechanism also controls a pawl 121 which contacts with the opposite side of the gear and is automatically manipulated by the connecting rod 122. This locking mechanism is automatically released when the projection 120 reaches and contacts with the vertical pin 123 mounted on the table. As the mold after having been deposited with dough is being advanced to the right the mold lock 51, is automatically placed in locked position by means of it contacting with the finger 124, which is located on the stationary frame and is so positioned that the lock will ride up on the inclined surface 125, and then be pressed inwardly by the rounded surface 126 formed on the inside of the finger. This operating will then keep the shaft of the molds locked together until it makes its round and contacts with the pin 56 of the releasing lever.

Under the table is located a gas supply pipe 127 to which a plurality of burners are connected and which burners are located under the apertures located in the table. This supply pipe is provided with a controlling valve 128, the stem of which is attached to a standard 129, and this valve is automatically opened and partly closed during the rotation of the table by the star wheel 130, contacting with the pin 131. This star wheel is rotated by the shaft 132 which shaft is controlled by a gear 133 meshing with the rack 32.

The valve is spring controlled so as to return it to its normal position when the star wheel is released from the pin. The purpose of this is to lower the flame during the period while the molds are passing from one burner to the other so as to save gas.

On the top of the stationary frame of the table and at suitable intervals are horizontal racks 134 which are so positioned and of such length as to turn the mold during the rotation of the table so that the heat from the burner may contact with the under side as well as the top of the mold for baking the cake uniform.

The operation of my invention is as follows:

To form and bake the cones by my improved invention I first place into the mold a sufficient amount of dough by means of the dough container, then the upper half or hinged section of the mold is lowered in position and then by the manipulation of the lever 103 the clutch 39 and 38 are engaged and the gear wheel 37 placed in rotation and by means of its meshing with the gear 32 the table is placed in operation.

As the first filled mold reaches the finger 124 secured to a stationary part of the frame it automatically closes the latch 51 locking the two sections comprising the shaft that carries the mold and this latch keeps the molds in locked position until it has made its complete rotation and then the latch is automatically opened by means of the lever 57.

When the table is rotated a short distance until the next mold reaches the point of filling the rotation of the machine is stopped automatically by means of the pawl 109 pulling on the cable 110, and the table is again placed in operation by the operator placing his foot on the foot treadle 104 thereby operating the clutch 39 engaging it with its companion member 38. Before it is again started this mold is filled with dough, by the time the first filled mold has been carried by the rotation of the table and the machine can be stopped, it brings the first mold over one of the burners which is located beneath the table, this mold is being partially heated while the second mold is being filled when the machine is again operated as previously stated the third mold is brought in position ready to be filled. By that time the first mold has made a quarter revolution and before it reaches its quarter position the mold has been turned around by means of the gear 49 contacting with the rack 134 formed on the stationary frame; this permits the heat from the second burner to heat the opposite side of the mold. This is the general operation of the filling process and when the first mold filled has made its complete circuit with the table the latch which holds the mold together is automatically released by the lever 57, so that when it reaches its filling point the operator then places the lever 80 in position so that its pin 81 is in direct alinement with the eye 82 formed on the upper section of the mold shaft. When the pin 81 is engaged in the eye the operator then presses his foot on the foot treadle 101 and by means of its extension it contacts with the foot treadle 102 pulling it down until the foot treadle 101 contacts with the block located directly beneath it. This movement operates the lever 97 together with the rod 98 bringing the clutch out of engagement with its companion member 92 placing it in an inoperative position and immediately upon the pin contacting the eye the operator then presses his foot on the treadle 102 which brings the lever 97 back to its full limit throwing the clutch 90 into the clutch 91 then the lever 80 is drawn up by means of the cable 84 being wound around the drum 87 raising the upper section of the mold, and during this raising process the dogs 68 are pushed forward by their operating mechanism slightly raising the plate 64 releasing the baked cake from the bottom section of the mold.

The operator then removes the baked cake from the mold all of the cones being connected to a thin film of baked dough and this complete set of baked cones is then placed in a trimming machine which is stationed in closed proximity to the table, the construction of said trimming machine being illustrated in the application for patent filed by me on September 2nd, 1919, Serial No. 321,062. After the baked cake has been removed a new batch of dough is filled in the molds, the operator then releases the clutch 90 from 91 by means of manipulating the lever 97, then the mold returns to its position by its own gravity unwinding the cable from the drum as at this point the drum is located idly on the shaft. During the manipulation of the drum for drawing up the mold the button or ball 93 located on the cable will contact with the arm 94 manipulating the lever 95 exerting a pull on the cable 96, thereby automatically drawing the lever 97 inwardly and releasing the clutch 90 and engaging the opposite clutch 92 which automatically stops the pulling pressure on the cable. The drum is thrown in and held in locked position by a spring connected to the lever 97.

During the rotation of the table carrying with it the several molds over the various burners and turning the molds at various intervals by means of the racks 134 and when the mold reaches a given point the table is automatically stopped by means of notches formed in the periphery; these notches are so arranged as to engage with pawls, the first operation is that while that notch 108 comes in alinement with the pawl 109 this pawl seats itself in the notch and when so seated during the continuation of the revolution of the table pulls the pawl 109 slightly forward and during this pulling process it pulls upon a cable 110 which cable is fastened to a lever 103 and by the time the pawl has been pulled forward a short distance it is automatically released from the notch 108 by means of its inclined surface riding on the pin 112, at the same time sufficient pull is on the cable to operate the lever 103, disengaging the operating clutch 39. At this juncture the table is stopped at its proper point by means of the pawl 107 engaging with one of the notches 108. This holds the table in its set locked position until the operator manipulates the lever 103 which is brought in contact with the arm of the pawl 107 thereby releasing it from the notch 108, and at the same time throwing in the clutch. When the molds reach the filling and discharging point the locking mechanism which holds the split gear in position is locked by means of the pin 116 connected to the lever mechanism and which is placed in and out of engagement by manipulation of the lever 97. This locking mechanism which holds the lower half of the gears rigid is automatically released when the downwardly projecting pin fastened to the member 118 contacts with the stationary pin 123 formed on the table. This then permits the gear to rotate whenever it contacts with one of the racks 134.

During the rotation of the table a burner mechanism is operated which is in the form of a star wheel having its prongs arranged to contact with a pin 131 which slightly shifts the post 129 which is connected to and operates a valve 128. This mechanism is placed in rotation by a gear on the center of the frame meshing with the gear 133 and the purpose of this mechanism is to lower the flame during the period when the molds pass from opening to opening so as to save as much gas as possible. The valve 128 is spring actuated and of ordinary type so that it returns to the full opening for the gas whenever one of the prongs releases itself from the pin 139.

Having fully described my invention what I claim is:

1. A rotary automatic cornucopia baking machine comprising a central casing, a table mounted thereon and adapted to be rotated with the casing, a stationary frame having a plurality of elongated openings in its top, said frame surrounding the casing and extending beneath and beyond the rotating table, a plurality of baking molds carried by the table, a gear mounted on the molds and racks located on the stationary frame for turning the molds at suitable intervals, substantially as specified.

2. A rotary automatic cornucopia baking machine comprising a central hollow casing, a base supporting the same, a table mounted on the casing and adapted to rotate therewith, a stationary frame located beneath the table the same having openings in its top, a driving mechanism in engagement with the casing by which the casing and table is placed in rotation, a clutch mechanism forming a part of the driving mechanism by which the movement is regulated, a plurality of baking molds mounted on said table and carried thereby in combination with a burner mechanism for imparting heat to the burners during their travel with the table, substantially as specified.

3. A rotary automatic cornucopia baking machine comprising a central standard, a base on which the same is mounted, a table mounted on the standard and adapted to be rotated with said casing, a driving mechanism for rotating the casing and table, a stationary frame surrounding the casing and table, the upper portion located beneath and projecting beyond the periphery of the rotating table, a plurality of mold incasing frames extending above openings formed in the rotating table, baking molds supported in said frames and permitted to be turned therein, a semi-circular shaft supporting each half of the mold, a split gear located on the semi-circular shafts, a latch carried by one of the halves of the shaft and arranged to contact with the other for holding the same in locked position, a dog mechanism carried by the table to engage the teeth of one half of the split gear to hold the same rigid when opening said mold, and racks carried on the stationary frame for rotating the molds when the split gear is brought in mesh herewith, substantially as specified.

4. A rotary automatic cornucopia baking machine comprising a rotary table, a standard supporting the same, a plurality of mold frames located on said table, a two part mold located in each one of said frames, a shaft supporting said mold and arranged in halves, each half supporting one portion of the mold, the upper half of said mold being hingedly connected to the lower half of the shaft, a split gear connected to the one half of said shaft, a latch carried by one half of the shaft and arranged to contact with the other for locking the same together, a driving mechanism for rotating the table and racks located at intervals apart for rotating the molds when the split gears are brought in mesh therewith, substantially as specified.

5. A machine of the class described comprising a stationary frame, a rotating table in close proximity therewith, a plurality of burners supported by the frame and located beneath the rotating table, a plurality of sectional baking molds pivotally mounted on the rotating table, a latch for holding the sectional molds in locked position, a means carried by the frame for releasing the latch at a certain period, a dog mechanism for holding the mold in a set-lock position and a means for automatically releasing the locking dogs when the machine is again placed in rotation, substantially as specified.

6. A machine of the character described comprising a rotating table, a plurality of sectional baking molds pivotally carried by said table, one section of the mold being hingedly connected to the other, a lever to be brought in contact with the upper half of the mold for elevating said mold so as to remove the baked cake, a driving mechanism for rotating the table and a winding mechanism for raising the lever and the mold, substantially as specified.

7. A machine of the character described comprising a rotatable table, a plurality of sectional baking molds mounted thereon, a driving mechanism for placing the table in rotation, a pawl mechanism located on the table for automatically stopping the movement of the table at certain intervals, a lever mechanism for controlling the movement of the driving mechanism in combination with burners located beneath the table for heating the molds during their travel over the same, substantially as specified.

8. A rotary automatic cornucopia baking machine comprising a center casing, a table mounted thereon and placed in rotation with the rotation of the casing, a plurality of sectional baking molds pivotally mounted on said table, said molds being constructed of two sections, separating plates carried by each section by which the baked cake is removed from the surface of the mold, means carried on the shaft of the molds for operating the plates, and a lever operated from the driving mechanism for raising the upper half of the mold, substantially as specified.

9. A rotary automatic cornucopia baking machine comprising a rotary table, a frame mounted beneath said table, a plurality of sectional baking molds carried by said table, each section of said mold supported on a semi-circular shaft, the shaft supporting the upper section of the mold hingedly secured to the lower section of the shaft, plates carried by each section of the mold for removing the baked cake from the surface of the mold, a mechanism carried by the upper shaft for contacting with and operating the separating plate of the lower section of the mold, a spring controlled releasing mechanism mounted on the upper section of the mold for operating the separating plate, a split gear attached to both sections of the mold shaft, a latch carried by one section and engaging with the other, a driving mechanism for placing the table in rotation, a lever for engaging the upper section of the mold for raising the same and a means operated by the driving mechanism for operating the lever for raising up the mold, substantially as specified.

10. A rotary automatic cornucopia baking machine comprising a plurality of sectional baking molds pivotally mounted on a rotating table, burners located beneath the same, a locking means for holding the sections of the mold in locked position, a means for automatically releasing the mechanism at a given period, a means for elevating the upper pivotal section of the mold when desiring to release the baked cake and for replenishing the dough, a locking mechanism for supporting the lower half of the mold while the upper half is being raised and lowered, a means for releasing the locking mechanism during the rotation of the table after the upper half has been placed in position and a means for binding the two halves of the mold in locked position, substantially as specified.

11. A device of the character described comprising a plurality of sectional baking molds pivotally mounted on a rotating table each section of said mold being provided with spring actuated plates for releasing the baked cake from its surface, a mechanism operated by the movement of the upper half of the mold for manipulating the releasing plate of the lower section of the mold, a split gear fastened to the shafts of both sections of the mold, means for holding the shafts together and racks located on the stationary portion of the frame for rotating the molds at proper intervals, substantially as specified.

12. A machine of the character described comprising a stationary frame, a rotating table operating therein, a center support, a base supporting the center support, a gear formed on the center support, a driving mechanism in engagement with the gear on the center support, a latch controlled drum located in the center casing, a plurality of sectional molds pivotally mounted on the rotating table, the upper half of the mold hingedly connected to the lower half and a lever brought in contact with the upper section of the mold and operated by the winding drum and holding the same in elevated position, substantially as specified.

13. A rotary automatic cornucopia baking machine comprising a center supporting casing, a table attached thereto, a stationary frame located around the table and permitted to project beyond the same, a plurality of sectional pivotally mounted baking molds carried by the table, an operating mechanism registering with the center supporting casing and imparting rotation thereto in combination with a plurality of burners supported by the stationary frame and located beneath the rotating table and a means operated by the center supporting casing for regulating the gas supply to the plurality of burners lowering the flame of each burner while the molds are traveling from one burner to the other, substantially as specified.

14. A machine of the character described comprising a stationary frame, a rotating table located within the frame, a center supporting casing supporting the rotating table, a driving mechanism registering with the casing for imparting motion thereto, a plurality of sectional pivotally mounted baking molds carried by the table, a mold shaft supporting the sections of the mold, a mold supporting frame mounted on the table in which the mold is located, a stripping plate carried by each section of the mold for removing the baked cake from the surface of the mold, a means carried by the mold shaft for operating the stripping plate carried by the lower section of the mold, a means carried by the upper section of the mold for moving the stripping plate carried by said section, a split gear mounted on the outer free end of the mold supporting shaft, a dog mechanism carried by the table and in close proximity with the split gear, a means carried by the stationary frame for placing the dogs in locked position against the gear at the proper period, a means carried by the frame for releasing the dog mechanism at a proper period, a latch carried by the shaft, a means for releasing the same at a proper period, racks located at intervals on the stationary table which impart motion to the split gear when brought in contact therewith, in combination with a plurality of burners carried by the stationary frame and beneath the baking molds and a means for regulating the flame of each burner during the traveling of the molds over said burners, substantially as specified.

In testimony whereof, I have signed my name to this specification, in presence of two subscribing witnesses.

MICHAEL J. WOLFF.

Witnesses:
BIRDIE M. AUSTINE,
ALFRED A. EICKS.